US008380892B2

(12) United States Patent
Miyazawa

(10) Patent No.: US 8,380,892 B2
(45) Date of Patent: Feb. 19, 2013

(54) APPARATUS, METHOD AND PROGRAM

(75) Inventor: Hiroyasu Miyazawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 134 days.

(21) Appl. No.: 12/540,471

(22) Filed: Aug. 13, 2009

(65) Prior Publication Data

US 2010/0064068 A1 Mar. 11, 2010

(30) Foreign Application Priority Data

Sep. 9, 2008 (JP) ................................ 2008-231413

(51) Int. Cl.
*G06F 3/00* (2006.01)

(52) U.S. Cl. ........................................................ 710/19

(58) Field of Classification Search ..................... 710/19
See application file for complete search history.

(56) References Cited

U.S. PATENT DOCUMENTS 7,322,010 B1 * 1/2008 Mikula ......................... 715/734
7,337,308 B2 * 2/2008 Andrew et al. ................... 713/1
7,533,277 B2 * 5/2009 Bernstein et al. ............. 713/300
7,574,591 B2 * 8/2009 Downer et al. ................... 713/1
2009/0015867 A1 * 1/2009 Ukegawa ..................... 358/1.16
2010/0064126 A1 * 3/2010 Yi et al. ............................ 713/2

FOREIGN PATENT DOCUMENTS

JP 11-194847 7/1999
JP 2000-263895 A 9/2000
JP 2000-339053 A 12/2000

OTHER PUBLICATIONS

Ricoh, Fast wide-format multifunctionals for peak performance, Aficio W5100/W7140; coverpage, p. 3, copyright 2008 [retrieved online Apr. 26, 2012 from <URL:http://www.ricoh-ap.com/products/cat6/pid550broch.pdf>].*
Operating Instructions, Aficio MP 6000/7000/8000; coverpage, p. 4, 8, 144, 145, 161, copyright 2007 [retreived online Apr. 26, 2012 from <URL:http://support.ricoh.com/bb_v1oi/pub_e/oi/0001034/0001034058/VD0527652/D0527652.pdf>].*
Notification of Reasons for Refusal issued Sep. 11, 2012, in Japanese Application No. 2008-231413.

* cited by examiner

*Primary Examiner* — Henry Tsai
*Assistant Examiner* — Eric Oberly
(74) *Attorney, Agent, or Firm* — Fitzpatrick, Cella, Harper & Scinto

(57) ABSTRACT

Provided are an apparatus, a method, and a program for displaying an operating screen in a short time when the apparatus is powered on after change in configuration thereof. After the apparatus is powered on, the operating screen on the previous activation is displayed, and a simplified screen is displayed if the configuration of the apparatus is different from that on the previous activation.

5 Claims, 14 Drawing Sheets

200

| CONFIGURATION INFORMATION ATTRIBUTE ID (201) | CONFIGURATION INFORMATION ATTRIBUTE NAME (202) | CONFIGURATION INFORMATION ATTRIBUTE VALUE (203) |
|---|---|---|
| xxxxxxx001 | FACSIMILE BOARD | FAXBD01 |
| xxxxxxx002 | FACSIMILE BOARD SPEC | cc |
| xxxxxxx003 | VOICE BOARD | SNDBD01 |
| xxxxxxx004 | VOICE BOARD SPEC | dd |
| xxxxxxx005 | HDD MODEL | HDD01 |
| xxxxxxx006 | FACSIMILE FUNCTION | 0 |
| xxxxxxx007 | BOX FUNCTION | 1 |
| xxxxxxx008 | PULLSCAN FUNCTION | 1 |
| xxxxxxx009 | RECEIVING PRINT FUNCTION | 0 |
| xxxxxxx010 | REPORT PRINT FUNCTION | 0 |
| xxxxxxx011 | VOICE SYNTHESIS FUNCTION | 0 |
| xxxxxxx012 | VOICE RECOGNITION FUNCTION | 1 |

FIG.2

APPARATUS, METHOD AND PROGRAM

BACKGROUND OF THE INVENTION

1. Field of the Invention

The present invention relates to an apparatus, a method and a program, and more particularly, to an apparatus, a method and a program for displaying an image at high speeds when the apparatus is powered on.

2. Description of the Related Art

In conventional apparatuses such as a copier having a display part for displaying an operating screen, widely used are those to which various devices are connected and various types of software are installed. Some of these apparatuses are designed so as to obtain configuration information there inside (information including that on a connected device and that on installed software) upon activation, thereby displaying an operating screen corresponding to the configuration information thereof at a display part.

It is also known that power saving technologies are used in these apparatuses such as suspend and hibernation in which a status of apparatus configuration is stored to halt an operation temporarily and the thus stored status is read thereafter, thereby making it possible to recover the operation at high speeds.

Japanese Patent Laid-Open No. H11-194847 (1999) discloses technologies for reducing the power consumption during suspend.

However, in an apparatus such as a conventional copier, when apparatus configuration is changed (addition or exchange of a device) to power on the apparatus thereafter, it takes a very long time (for example, 20 seconds) to obtain configuration information inside the apparatus. Therefore, a long time is needed to display an operating screen. As a result, a user has been required to wait in the front of the apparatus for a long time and feels dissatisfied with the long wait.

Further, if an apparatus is changed in device configuration such as insertion or removal of a non-hot plug while being halted for operation in a state of suspend or hibernation, an error may take place at the time of recovery of the operation, resulting in a failure of displaying an operating screen normally. In this case, the apparatus is required to be rebooted, thus requiring a long time until the operating screen is displayed.

SUMMARY OF THE INVENTION

An object of the present invention is to provide an apparatus, a method and a program for displaying an operating screen in a short time when the apparatus is powered on after change in configuration thereof.

An apparatus of the present invention having a unit for storing configuration information at that time upon receiving an instruction for power-off of the apparatus, comprising: a unit for making a display unit display a screen which has been displayed upon receiving the instruction for power-off after the apparatus is powered on when receiving an instruction for power-on of the apparatus; and a unit for detecting whether configuration information at the present time is changed from the thus stored configuration information, wherein if any change is detected by the unit for detecting, the unit for making display makes a display unit display the other screen.

A method of the present invention for controlling an apparatus having a unit for storing configuration information upon receiving an instruction for power-off of the apparatus, the method including the steps of: displaying a screen which has been displayed upon receiving the instruction for power-off after the apparatus is powered on, when instructions are received for power-on of the apparatus; and detecting whether the configuration information at the present time is changed from the stored configuration information, wherein if any change is detected by the detecting step, the displaying step displays the other screen.

According to the present invention, it is possible to provide an apparatus, a method and a program for displaying an operating screen in a short time when the apparatus is powered on after change in configuration thereof.

Further features of the present invention will become apparent from the following description of exemplary embodiments (with reference to the attached drawings).

BRIEF DESCRIPTION OF THE DRAWINGS

FIG. 2 is a table showing one example of data configuration of configuration information;

DESCRIPTION OF THE EMBODIMENTS

Hereinafter, a description will be given for the best mode for carrying out the present invention with reference to the drawings.

Figure 1:
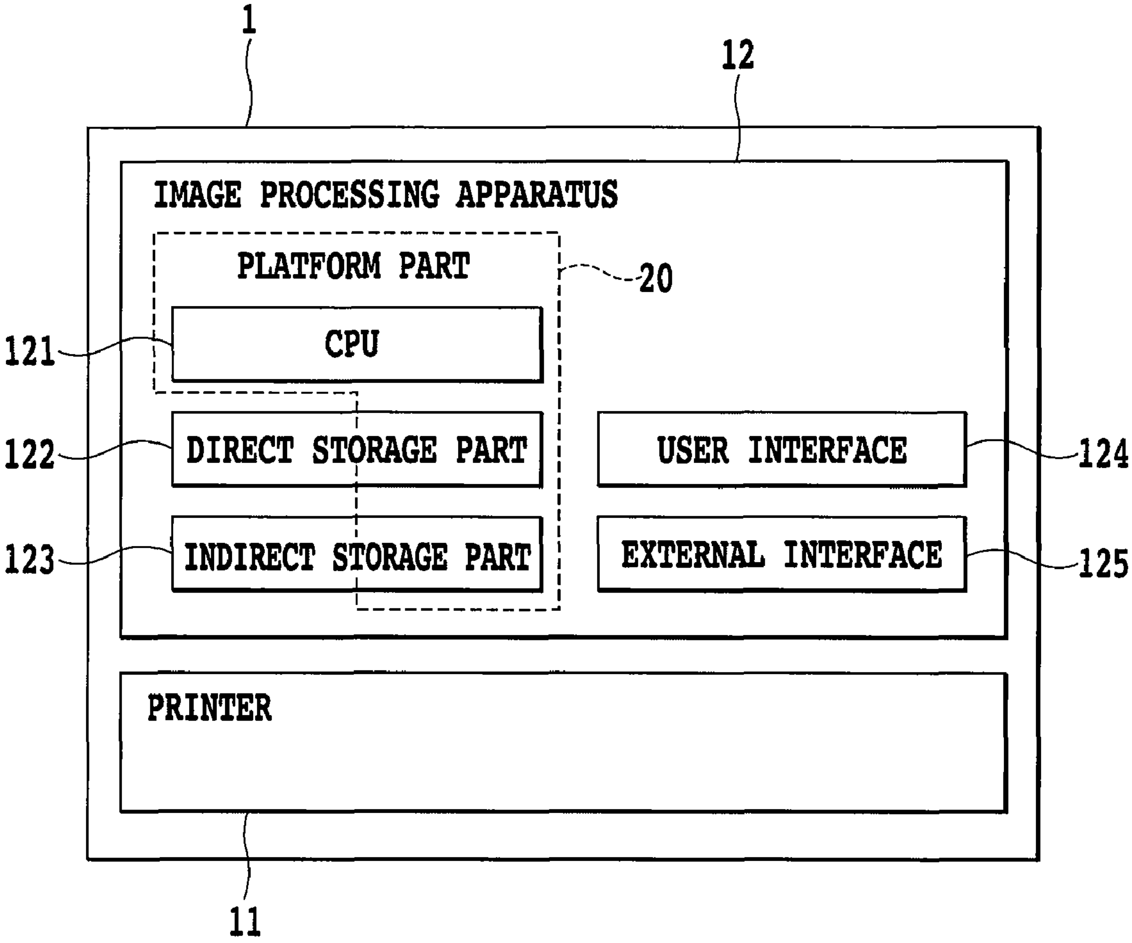
FIG. 1 is a block diagram showing one example of configuration of an image forming apparatus.

FIG. 1 is a block diagram showing a schematic configuration of an image forming apparatus to which an application platform (hereinafter, simply referred to as "platform") is applied as one example of a configuration of the apparatus of the present embodiment.

(Description of Image Forming Apparatus 1)

The image forming apparatus 1 is provided with a printer 11 and an image processing apparatus 12.

The image processing apparatus 12 is provided with a CPU 121, a direct storage part 122 (for example, RAM), an indirect storage part 123 (for example, ROM and HDD), a user interface 124, and an external interface 125.

The direct storage part 122 is a storage part which directly exchanges data with the CPU 121, and the indirect storage part 123 is a storage part which exchanges data with the CPU 121 via the direct storage part 122. When the image forming apparatus 1 is in a state of activation, the direct storage part 122 stores various application programs read from the indirect storage part 123 and a platform program which acts as a basis of operating these application programs.

The user interface 124 includes a power supply switch, a key operating part, a touch panel, a display (display part), and the like. The display is able to display data (screen data) via the key operating part or others according to instructions from a user or a state of processing or configuration of the image forming apparatus 1.

The external interface 125 is an interface capable of receiving data from an external apparatus (device) and sending data to the external apparatus. For example, the external apparatus includes an external storage apparatus such as an external HDD and an external USB memory, a separate host computer connected via a network, and a separate apparatus such as an image forming apparatus. A single or a plurality of external apparatuses are connected to the image forming apparatus 1 via the external interface 125.

(Description of Platform Part 20)

The CPU 121 is able to move (store) a platform program stored in the indirect storage part 123 to the direct storage part 122. Upon completion of the movement, the CPU 121 is in a state capable of executing the platform program. Of the present embodiment, as described above, "a state that the CPU 121 is in a state capable of executing the platform program" is referred to as activation of the platform part 20.

It is noted that, of the present embodiment, a combination of the following configurations is referred to as a platform part 20. That is, the platform part 20 includes the CPU 121, a region inside the direct storage part 122 at which a platform program is stored, and a region inside the direct storage part 122 and the indirect storage part 123 for storing information obtained when the CPU 121 processes the platform program (calculation results and others).

(Description of Application Program)

The platform part 20 is able to move (store) a first application program stored in the indirect storage part 123 to the direct storage part 122. Upon completion of the movement, the platform part 20 is in a state capable of executing the first application program. Of the present embodiment, this is referred to as activation of the first application program by the platform part 20.

FIG. 2 is a table relating to data structure showing one example of configuration information of the image forming apparatus 1 of the present embodiment.

The configuration information includes information on the configuration of an apparatus such as information on a device connected to the apparatus and information on installed software, information on their attributes (for example, information on a model number of the device, option information (information on whether both-side printing is available or not), and license information). Further, the configuration information 200 does not include targets having attributes to be detected for any change by the apparatus on a steady basis such as connection to a LAN and insertion or removal of a USB memory. These targets are managed for the configuration by existing technologies (plug and play or others).

The configuration information 200 is stored in the indirect storage part 123 and managed for reading, updating and storage of information by the platform part 20.

A data item 201 indicates "configuration information attribute ID" which is unique in the configuration information 200. A data item 202 is a data item indicating "configuration information attribute name." A data item 203 is a data item indicating "configuration information attribute value." One set of values established respectively for the data items 201, 202 and 203 constitutes one record of configuration information.

For example, the configuration information 200 includes a record in which the data item 201 is "xxxxxx001," the data item 202 is "facsimile board," and the data item 203 is "FAXBD01." This indicates that a facsimile board in which a configuration information attribute ID is "xxxxxxx001" and a model name (or model number) is "FAXBD01" is connected to the image forming apparatus 1.

The platform part 20 updates a configuration information record on the configuration information 200 when an external storage apparatus such as an external HDD is added to the external interface 125 or an application program is installed on the indirect storage part 123.

The platform part 20 updates a configuration information record on the configuration information 200 when an external storage apparatus such as an external HDD is removed from the external interface 125 or an application program is uninstalled from the indirect storage part 123.

Figure 3:
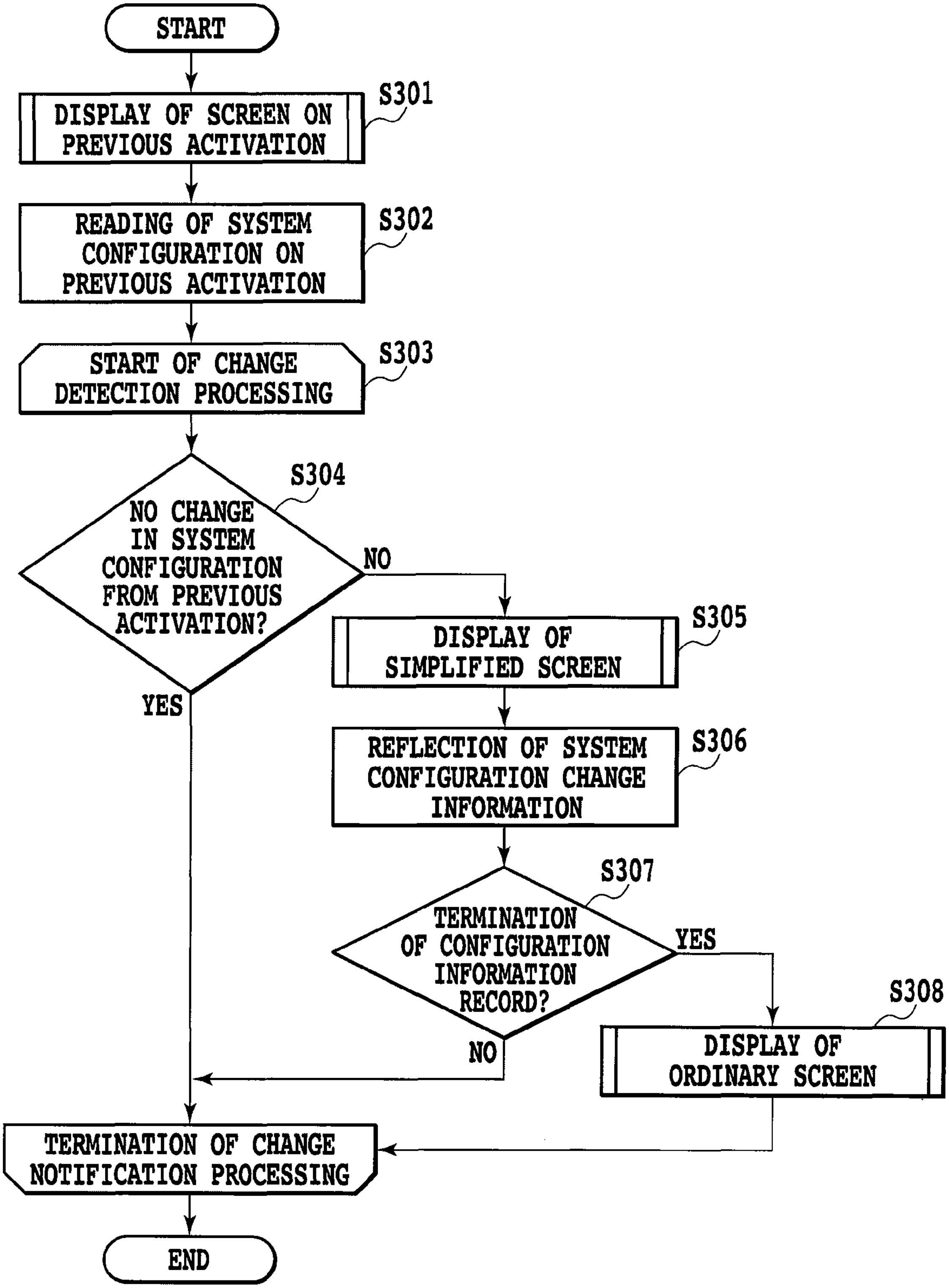
FIG. 3 is a flowchart showing one example of processing procedures by the image forming apparatus.

FIG. 3 is a flowchart showing the display of an operating screen on the previous activation, transition to a simplified screen and processing procedures for transition to an ordinary screen of the present embodiment. The simplified screen is an operating screen capable of operating only fundamental functions of an image forming apparatus. This processing is to be executed only once after the image forming apparatus 1 is powered on. Further, this processing is controlled by the CPU 121 reading a program for carrying out the processing stored in the storage part 122 or 123 and shown in FIG. 3 to execute the program. It is noted that power-on refers to changing a state that no electric current flows through the CPU 121, an indirect storage part or a direct storage part being changed into a state that electric current flows through the CPU 121, the indirect storage part and the direct storage part. Instructions for power-on of the image forming apparatus 1 mean that a user presses a power supply button on the image forming apparatus 1. Further, pressing of the power supply button allows electric current to flow through the CPU 121, the indirect storage part, and the direct storage part.

First, in Step S301, instructions for power-on of the image forming apparatus 1 are made from a power supply switch of the user interface 124, thereby activating the platform part 20. The platform part 20 reads data of an operating screen on the previous activation from the indirect storage part 123 and displays it on the display of the user interface 124. Next, the platform part 20 makes it possible to receive instructions from a user for the operating screen on the previous activation (via the user interface 124). It is noted that making it possible to receive instructions from a user for the screen in this case, makes it possible not only to receive instructions for the screen on the previous activation but also to receive instructions for a new screen created upon receiving instructions for the screen on the previous activation. The screen on the previous activation indicates a screen before the image forming apparatus 1 is powered off, and the platform part 20 saves the data on the screen displayed at the indirect storage part 123 at that time of power-off. The screen on the previous activation and the configuration information on the previous activation will be described later with reference to FIG. 11. According to the processing in Step S301, the platform part 20 first displays the operating screen on the previous activation on the display of the user interface 124 after the apparatus is powered on. Therefore, the platform part 20 is able to display an operating screen on the display before decision is made for an operating screen corresponding to a configuration of the image forming apparatus 1 at the present time. As a result, the operating screen can be displayed in a short time after the image forming apparatus 1 is powered on.

Then, in Step S302, the platform part 20 reads the configuration information 200 on the previous activation from the indirect storage part 123. This processing allows the platform part 20 to obtain the configuration information on the previous activation.

Then, in Step S303, the platform part 20 starts processing for comparing the configuration information 200 on the previous activation with configuration information of the image forming apparatus 1 at the present time. This comparison processing is carried out for every record included in the configuration information 200 and repeated until termination of all configuration information records of the configuration information 200. As described previously, this comparison processing is to be executed only once at that time of power-on in order to detect any change in configuration information 200 and shall not be carried out on a steady basis. Further, as described above, the configuration information 200 does not include targets having attributes to be detected for any change by the apparatus on a steady basis such as connection to a LAN and insertion or removal of a USB memory. Therefore, in Step S303, no detection is made for any change in targets having attributes to be detected for any change on a steady basis. It is noted that a different system is used to detect on a steady basis any change in these targets having attributes to be detected for any change on a steady basis. The platform part 20 changes an operating screen displayed on the display of the user interface 124 reflecting only the change thereof every time any change is detected. More specifically, in Step S303, the platform part 20 detects only the change of configuration information which is not in general inserted or removed after the apparatus is powered on.

Then, in Step S304, the platform part 20 compares each of the configuration information records of the configuration information 200 on the previous activation with each of the configuration information of the image forming apparatus 1 at the present time, thereby determining whether there is any difference. For example, the configuration information 200 includes a configuration information record in which the data item 201 is "xxxxxxx001," the data item 202 is "facsimile board" and the data item 203 is "FAXB01." The platform part 20 checks the configuration information at the present time on a facsimile board of the image forming apparatus 1. Then, the platform part 20 determines whether the facsimile board is included in a configuration of the image forming apparatus 1. And if the facsimile board is included, the platform part 20 determines whether a model name of the facsimile board is "FAXBD01." More specifically, a determination is made for the presence or absence of the facsimile board and any change in the connected facsimile board. Where the determination results in no difference between the information indicated by the record of the configuration information 200 and the configuration information at the present time on the image forming apparatus 1 (Step S304; Yes), processing is carried out for determining other records of the configuration information 200 which are not yet determined.

Further, where the platform part 20 consequently determines that there is a difference between a configuration indicated by a configuration information record and a configuration of the image forming apparatus 1 at the present time (Step S304; No), the processing proceeds to processing for displaying a simplified screen (Step S305).

In Step S305, the platform part 20 deletes an operating screen on the previous activation on the display of the user interface 124 and halts the receiving of instructions from a user for the operating screen on the previous activation. Further, the platform part 20 displays on the display of the user interface 124 a simplified screen which allows only fundamental functions of the image forming apparatus 1 to operate. Then, the platform part 20 makes it possible to receive instructions from a user for the simplified screen (via a key operating part or the like of the user interface 124). This simplified screen will be described later with reference to FIG. 6. More specifically, where the platform part 20 determines that there is a difference between a configuration indicated by a record of the configuration information 200 and a configuration of the image forming apparatus 1 at the present time (Step S304; No), the platform part 20 displays the simplified screen on a display (Step S305). As a result, the platform part 20 is able to obtain changed configuration information inside the image forming apparatus 1 and display an operating screen before completion of processing for determining an operating screen after change in configuration. Therefore, the platform part 20 is able to display the operating screen in a short time after the image forming apparatus 1 is powered on.

Then, in Step S306, the platform part 20 updates a record of the configuration information 200 on configuration information of the image forming apparatus 1 at the present time and stores it at the storage part 122 or 123. More specifically, with reference to the previous example, where a model of the facsimile board indicated by the data item 203 is different from a configuration at the present time, "FAXBD 01" is updated to a model name at the present time.

Then, in Step S307, the platform part 20 determines whether a configuration information record of the configuration information 200 to be compared is a configuration information record at the bottom (that is, whether processing for comparing all records of the configuration information 200 is terminated).

Where the configuration information record is not the configuration information record at the bottom (Step S307; No), the processing proceeds to Step S304, to carry out comparison for a next record.

Where the configuration information record is the configuration information record at the bottom (Step S307; Yes), the processing proceeds to Step S308, and the platform part 20 deletes a simplified screen now on display from the display of the user interface 124 after processing for updating the configuration information 200 is terminated. Accordingly, the platform 20 also halts to receive instructions from a user for the simplified screen. Then, the platform part 20 displays an ordinary operating screen reflecting a configuration indicated by the configuration information 200 after update on the display of the user interface 124, thereby making it possible to receive instructions from a user. Making it possible to receive instructions from a user means in this case that it is made possible not only to receive instructions for an ordinary operating screen but also to receive instructions for a new operating screen created upon receiving instructions for the ordinary operating screen. Details of processing for displaying the ordinary operating screen in Step S308 will be described later with reference to FIG. 10.

Figure 4:
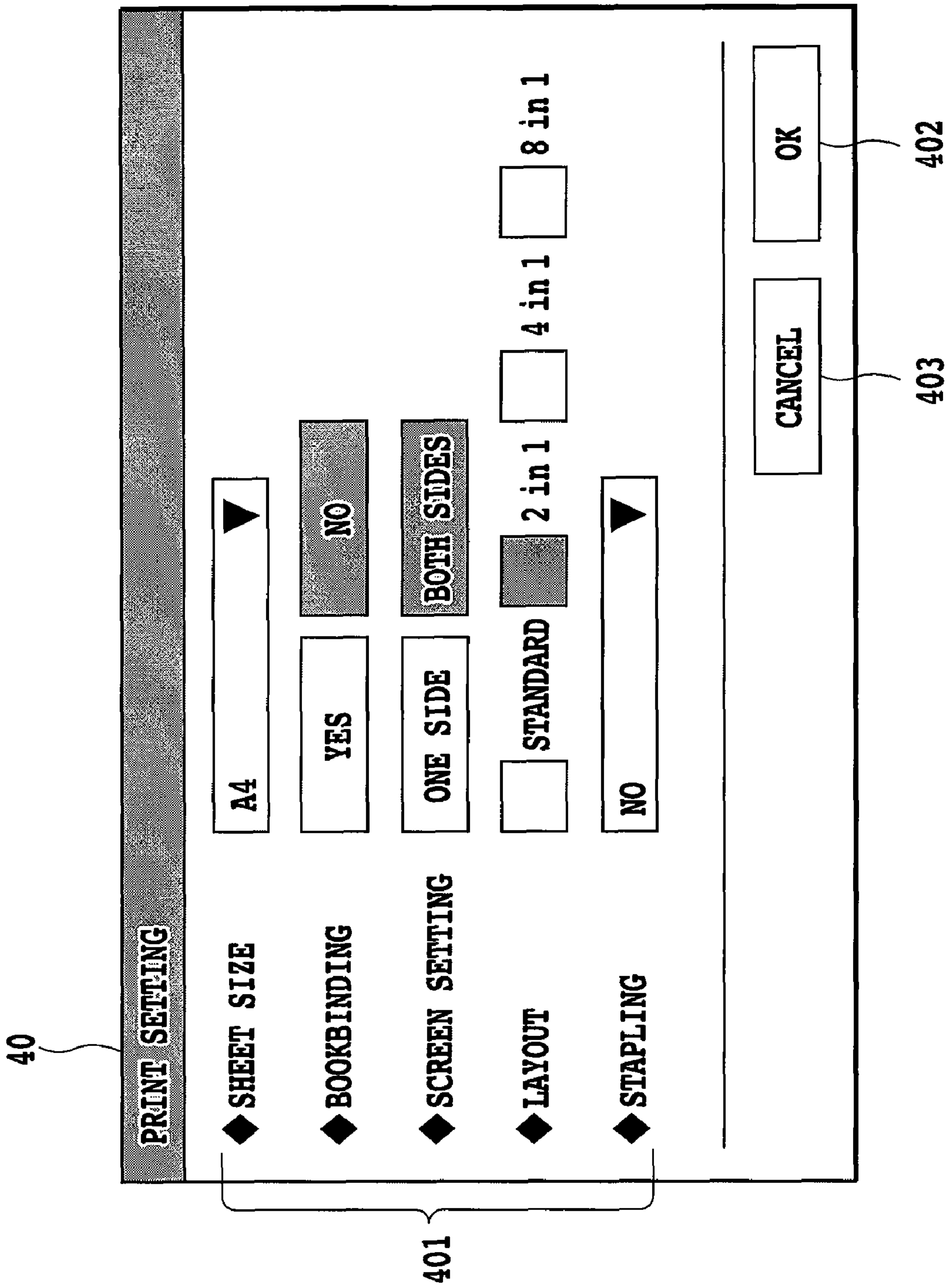
FIG. 4 is a drawing showing one example of an operating screen on the previous activation.

FIG. 4 shows an example of the operating screen on the previous activation of the present embodiment. The operating screen 40 on the previous activation is provided with a setting region 401, an execution button 402, and a cancel button 403 on the image forming apparatus 1. A print setting state with regard to sheet size, bookbinding, both-side setting, layout and stapling is indicated at the setting region 401. In this example, the layout is set to be "2 in 1." A key operating part and a touch panel on the user interface 124 are operated, by which the setting state can be changed.

Figure 5:
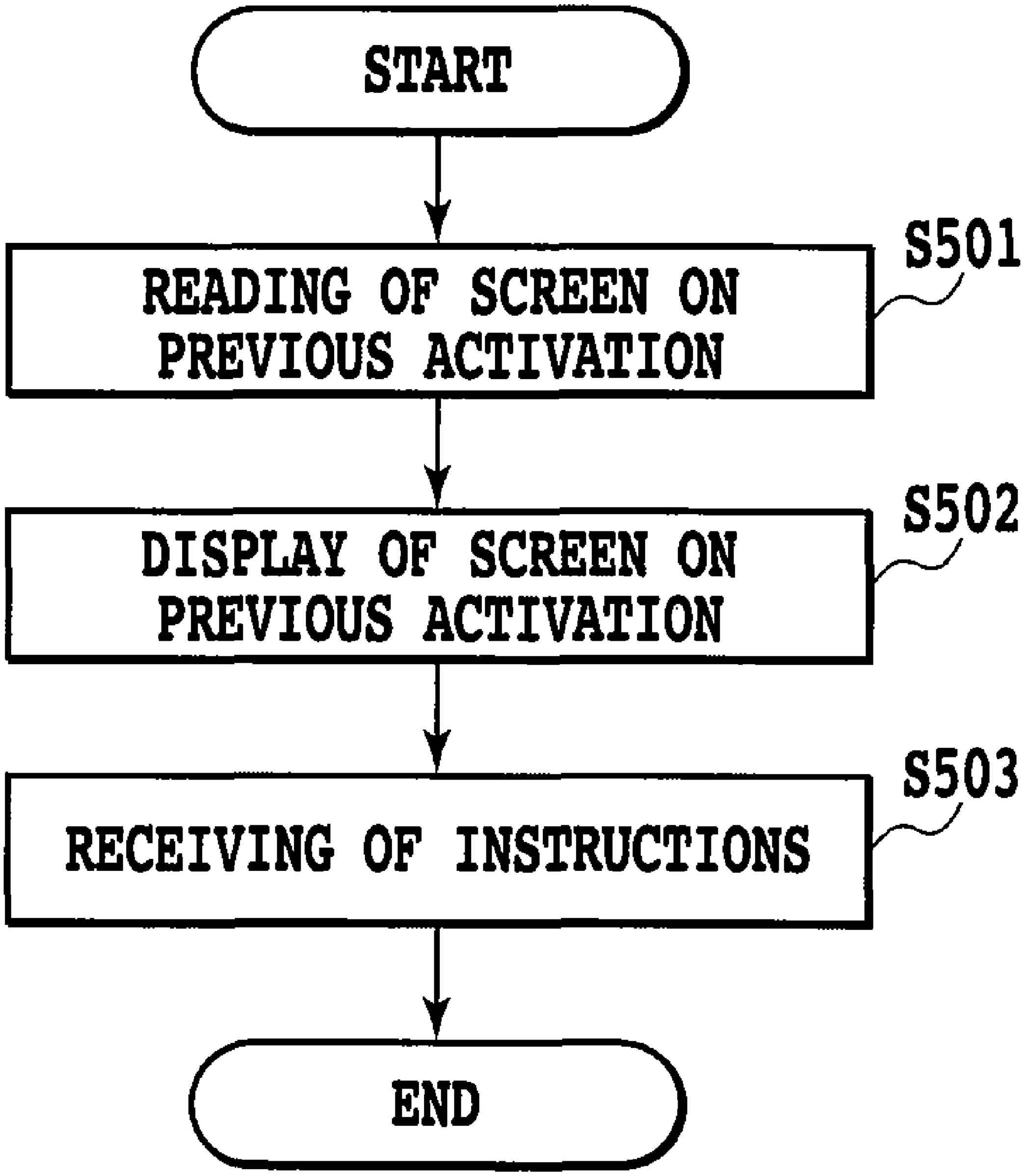
FIG. 5 is a flowchart showing one example of processing procedures by the image forming apparatus.

FIG. 5 is a flowchart showing the details of processing for displaying an operating screen on the previous activation in Step S301 of FIG. 3.

First, the platform part 20 carries out processing for reading data of an operating screen on the previous activation from the indirect storage part 123 (Step S501). Next, the platform part 20 loads the thus read data of the operating screen on the previous activation onto the direct storage part 122 and displays the operating screen on the previous activation on the display of the user interface 124 (Step S502). Then, the platform part 20 receives instructions from a user for the thus displayed operating screen via the key operating part and the touch panel on the user interface 124 (Step S503).

Figure 6:
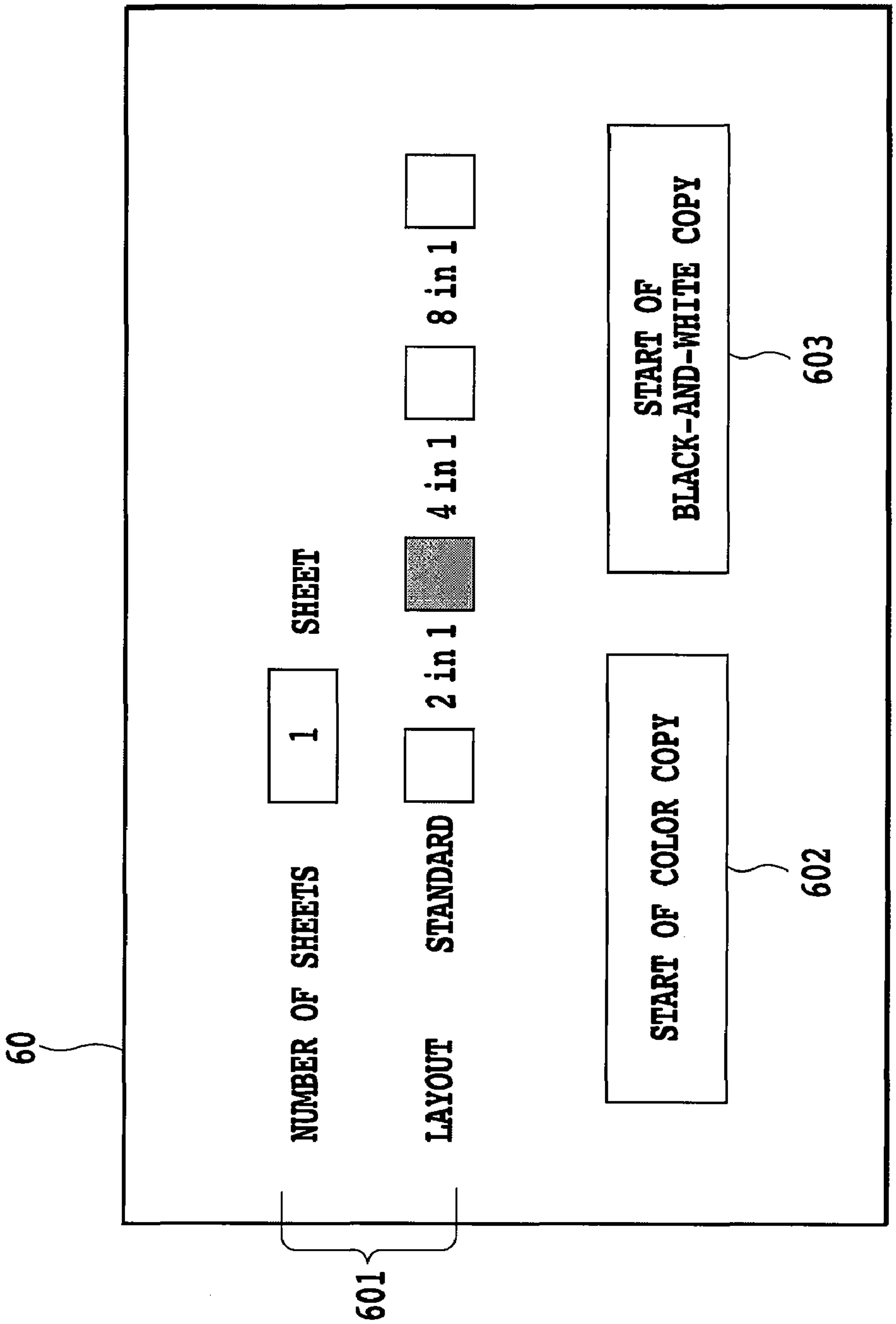
FIG. 6 is a view showing one example of a simplified screen.

FIG. 6 shows an example of a simplified screen displayed on the display of the user interface 124 in Step S305 of FIG. 3. The simplified screen 60 is an operating screen which makes it possible to operate only fundamental functions of the image forming apparatus 1. The simplified screen 60 is provided with a fundamental function setting region 601 and fundamental function execution buttons 602 and 603. The simplified screen 60 is in advance fabricated by a manufacturer, for example, on manufacturing the image forming apparatus 1.

Items that can be set on a simplified screen are selected from those which are less likely to be influenced by change of a device connected to an image forming apparatus or change of installed software. For example, "number of sheets" and "layout" displayed on the simplified screen 60 are setting items which may be set at a higher possibility irrespective of whether the device connected to the image forming apparatus or the installed software is changed or not. It is difficult to envisage that color materials such as inks are used at the time of power-off and the color materials are used up subsequently at the time of power-on. Therefore, in this case, a color-copy start button 602 and a black-and-white copy start button 602 are indicated on the simplified screen 60.

Figure 7:
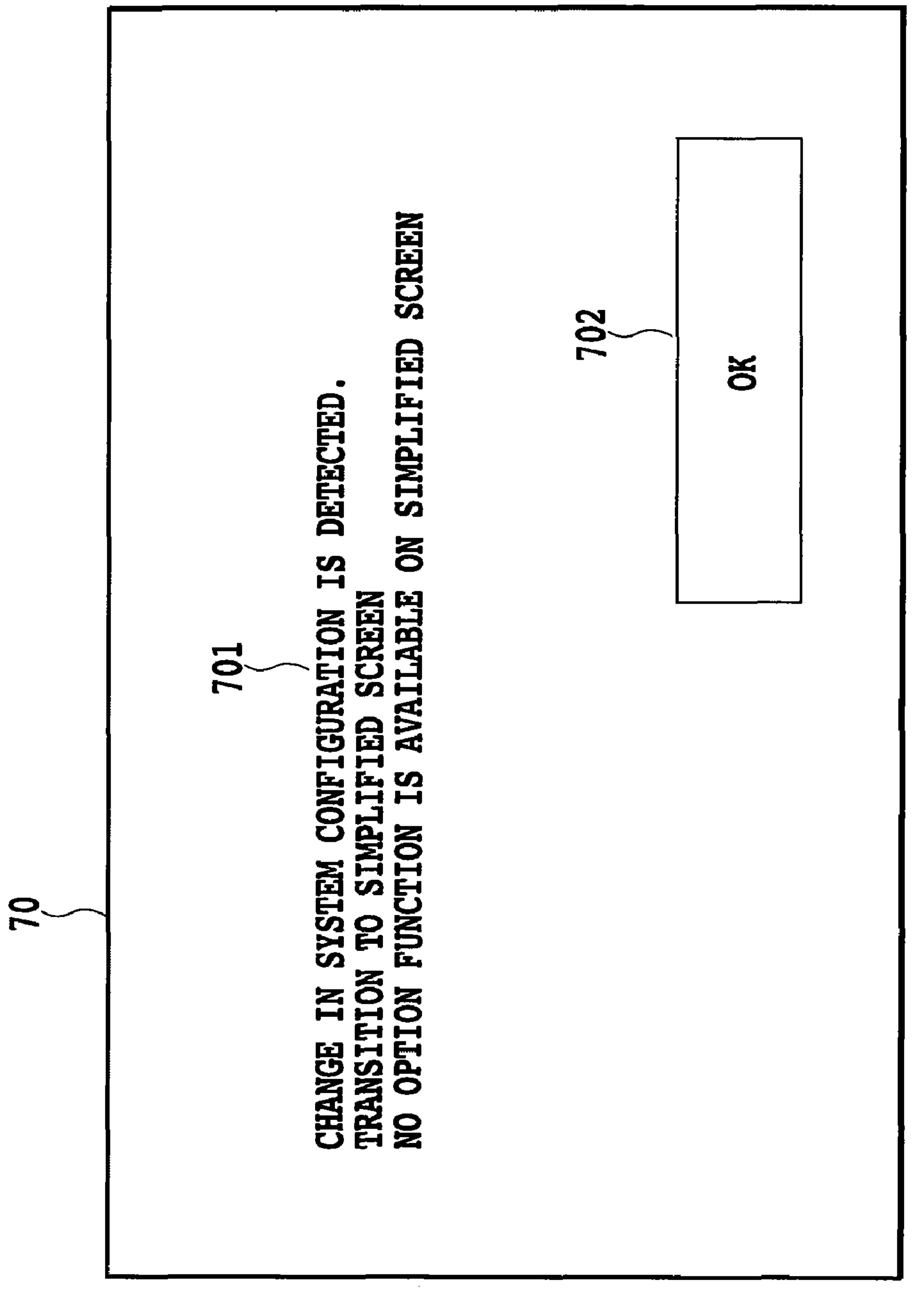
FIG. 7 is a view showing one example of a warning screen in transition to the simplified screen.

FIG. 7 shows an example of a warning screen displayed on a display in transition from the operating screen on the previous activation to a simplified screen in Step S305 of FIG. 3. The warning screen in transition 70 is provided with a warning message 701 and an OK button 702. The warning message 701 is displayed in a case where if the image forming apparatus 1 is changed in configuration on the previous activation, received are instructions for an operating screen on the previous activation as displayed in Step S301 before transition to a simplified screen by the processing in Step S305.

Figure 8:
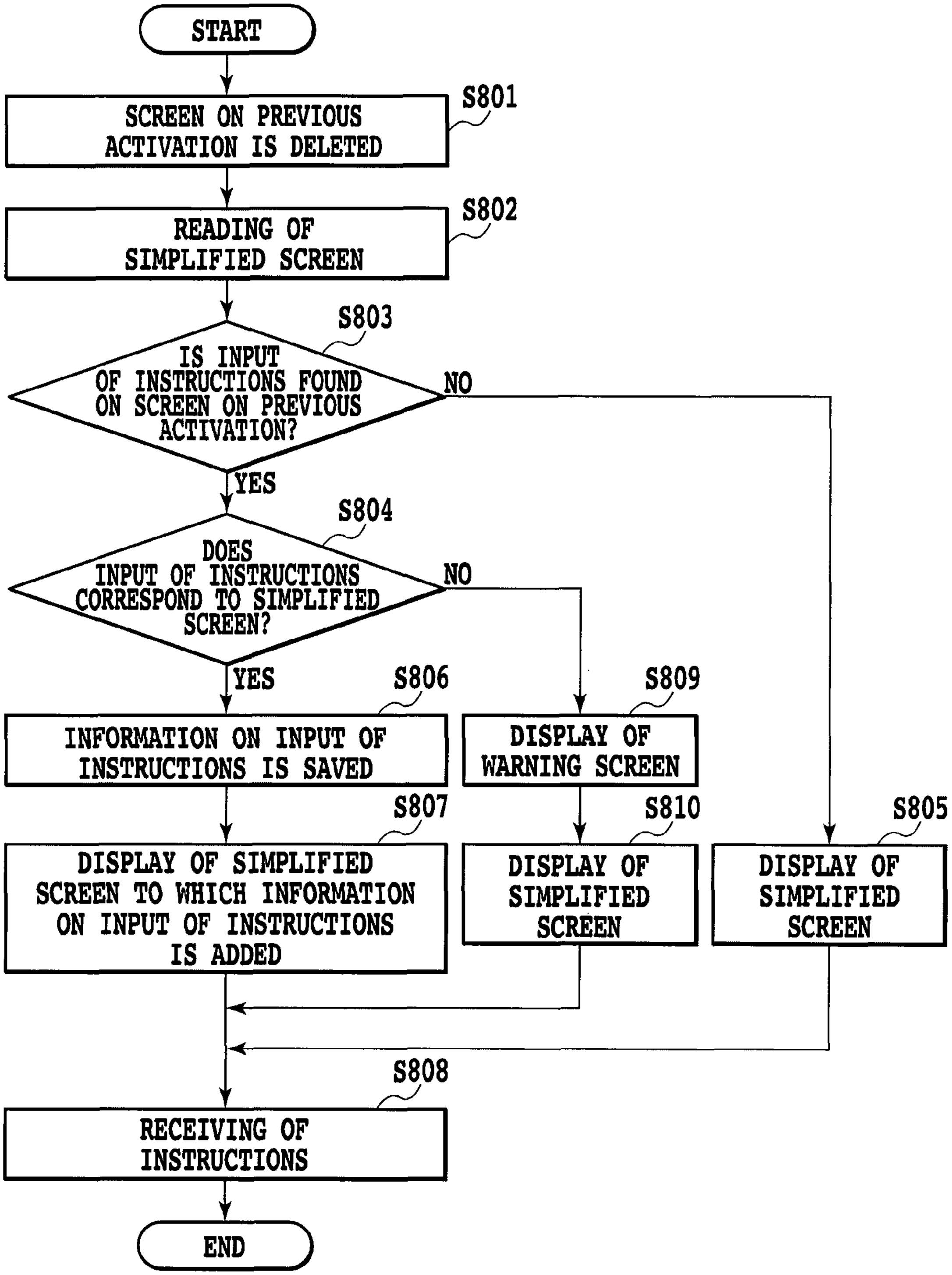
FIG. 8 is a flowchart showing one example of processing procedures by the image forming apparatus.

FIG. 8 is a flowchart showing the details of processing for displaying the simplified screen in Step S305 of FIG. 3.

First, the platform part 20 deletes an operating screen on the previous activation on the display of the user interface 124 and halts the receiving of instructions from a user. Upon receiving input of instructions from a user via a key operating part or the like while the operating screen on the previous activation is displayed on a display, the platform part 20 saves the input of instructions received from a user as data at the direct storage part 122 (Step S801).

Next, the platform part 20 carries out processing for reading the data on the simplified screen 60 from the indirect storage part 123 (Step S802). Then, the platform part 20 determines whether the user interface 124 receives instructions from a user, while a screen before power-off which is to be described later in S1105 of FIG. 11 (a screen on the previous activation which is saved at the indirect storage part 123) or an operating screen on the previous activation is being displayed. More specifically, the platform part 20 determines whether information on input of instructions received from a user is saved in the direct storage part 122 (Step S803).

Where the input of instructions from a user is saved at the direct storage part 122 (Step S803; Yes), the platform part 20 determines whether the thus saved input of instructions from a user is an instruction content which can be operated on a simplified screen (Step S804). The input of instructions from a user is, for example, setting of both-side printing or setting of number of sheets.

Further, where the input of instructions from a user is not saved at the direct storage part 122 (Step S803; No), the platform part 20 displays the simplified screen 60 read in Step S802 on a display (Step S805), and the processing proceeds to Step S808.

In Step S804, where the platform part 20 determines that the input of instructions can be operated (Step S804; Yes), the platform part 20 saves the input of instructions saved at the direct storage part 122 in Step S801 at the direct storage part 122 as information on input of instructions for a simplified screen (Step S806). Then, the platform part 20 displays on a display the simplified screen 60 which reflects the information on input of instructions for the simplified screen saved in Step S806 with respect to the simplified screen 60 read in Step S802 (Step S807), and the processing proceeds to Step S808. In this case, reflecting the information on input of instructions for the simplified screen with respect to the simplified screen 60 means that, for example, where the information on input of instructions for the simplified screen indicates setting of the number of sheets, this setting is given to the simplified screen 60. As described above, according to the processing in Step S806 and S807, even where the operating screen is deleted in Step S801 after receiving input of instructions from a user, the platform part 20 is able to display the simplified screen 60 which reflects the thus received input of instructions.

Further, where the platform part 20 determines in Step S804 that the input of instructions is an instruction content which cannot be operated on the simplified screen (Step S804; No), the platform part 20 reads a warning screen in transition 70 from the indirect storage part 123 and displays it on a display (Step S809).

Thereafter, upon receiving information that an OK button 702 of the warning screen in transition 70 via a touch panel or the like of the user interface 124 has been pressed, the platform part 20 displays the simplified screen 60 read in Step S802 on a display (Step S810).

Thereafter, in Step S808, the platform part 20 receives instructions from a user for the simplified screen 60 via a touch panel or the like of the user interface 124. Receiving of instructions from a user, in this case, makes it possible not only to receive instructions for a simplified screen but also to receive instructions for a new operating screen created upon receiving instructions for the simplified screen.

Figure 9:
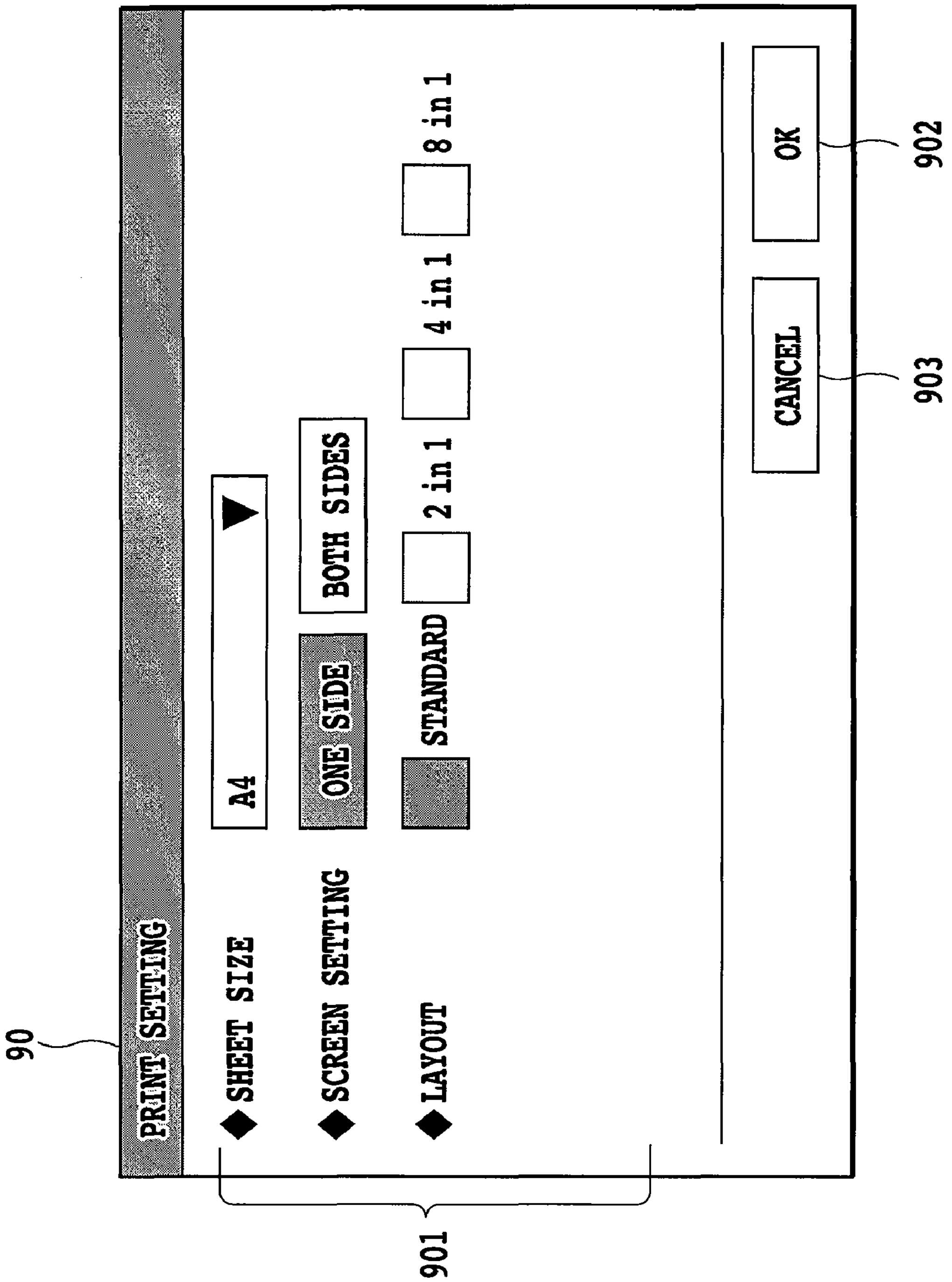
FIG. 9 is a view showing one example of an ordinary operating screen.

FIG. 9 shows an example of an ordinary operating screen displayed on the display of the user interface 124 in Step S308 of FIG. 3. The ordinary operating screen 90 is provided with a setting region 901 for changing the setting after activation of the image forming apparatus 1, an OK button 902, and a cancel button 903.

Figure 10:
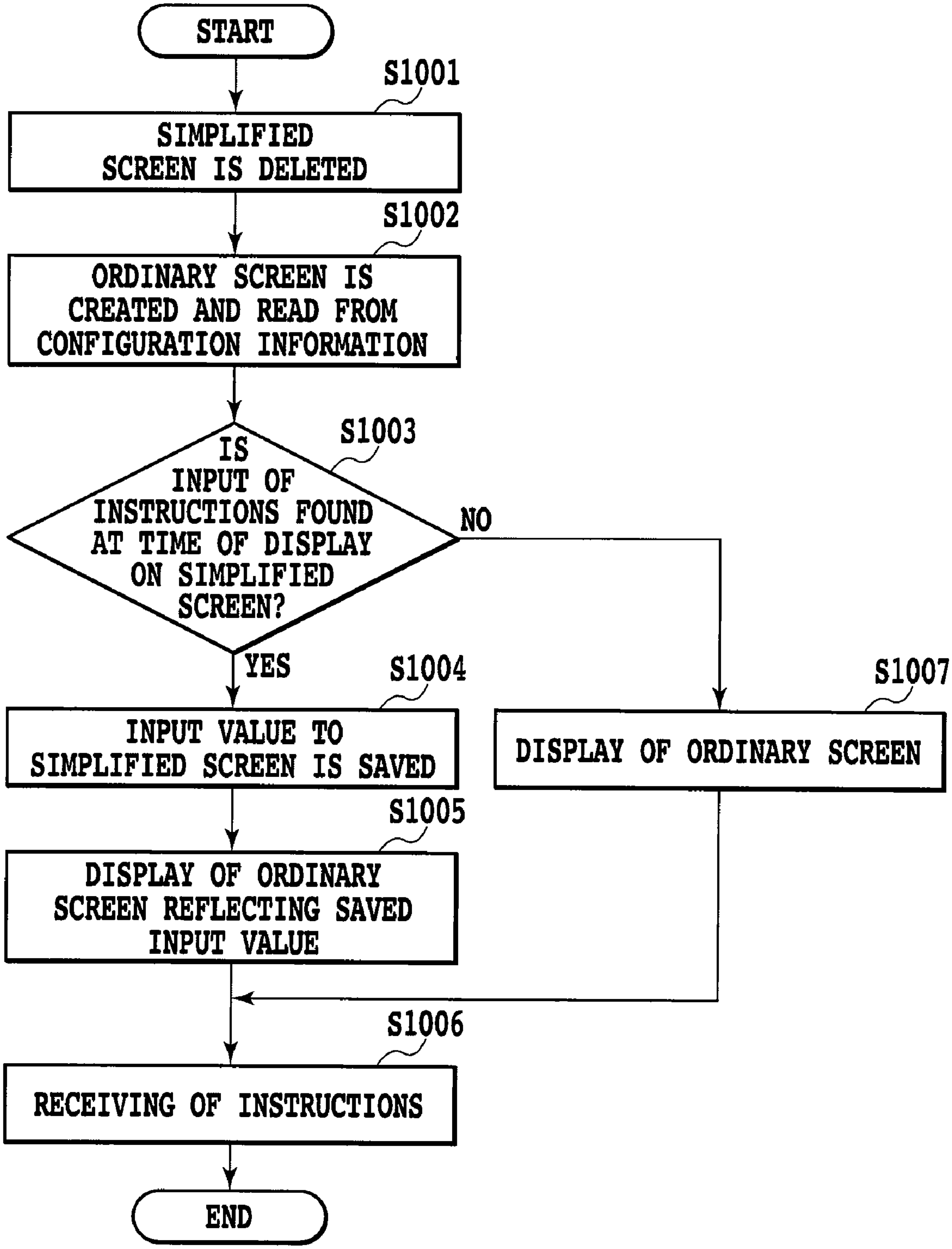
FIG. 10 is a flowchart showing one example of processing procedures by the image forming apparatus.

FIG. 10 is a flowchart showing the details of processing for displaying the ordinary operating screen in Step S308 of FIG. 3.

First, the platform part 20 deletes a simplified screen on the display of the user interface 124 and halts the receiving of instructions from a user. The platform part 20 saves the input of instructions from a user at the direct storage part 122 where instructions have been received from a user while the simplified screen is being displayed on the display of the user interface 124 (Step S1001).

Next, the platform part 20 creates an ordinary operating screen 90 from the configuration information 200 updated in Step S306 and reads it (Step S1002). More specifically, the platform 20 creates the operating screen 90 which reflects a configuration indicated in the configuration information 200 to read.

Then, the platform part 20 determines whether instructions for a simplified screen indicated in Step S305 are received from a user via a touch panel of the user interface 124 (Step S1003). More specifically, the platform part 20 determines whether the information on input of instructions received from a user is found at the direct storage part 122.

Where the determination made in Step S1003 is Yes, the platform part 20 saves the information on input of instructions from a user which has been saved in the direct storage part 122 in Step S1001 in the direct storage part 122 as information on input of instructions for an ordinary operating screen (Step S1004). Then, the platform part 20 reflects the information on input of instructions for an ordinary operating screen saved in S1004 with respect to an ordinary operating screen 90 read in Step S1002 and displays it on the display of the user interface 124 (Step S1005).

Further, where the determination made in Step S1003 is No, the platform part 20 displays the ordinary operating screen 90 read in S1002 on the display of the user interface 124 (Step S1007). The platform part 20 receives instructions from a user via a touch panel and the like of the user interface 124 (Step S1006). Receiving of instructions from a user, in this case, makes it possible not only to receive instructions for an ordinary operating screen but also to receive instructions for a new operating screen created upon receiving instructions for the ordinary operating screen.

Figure 11:
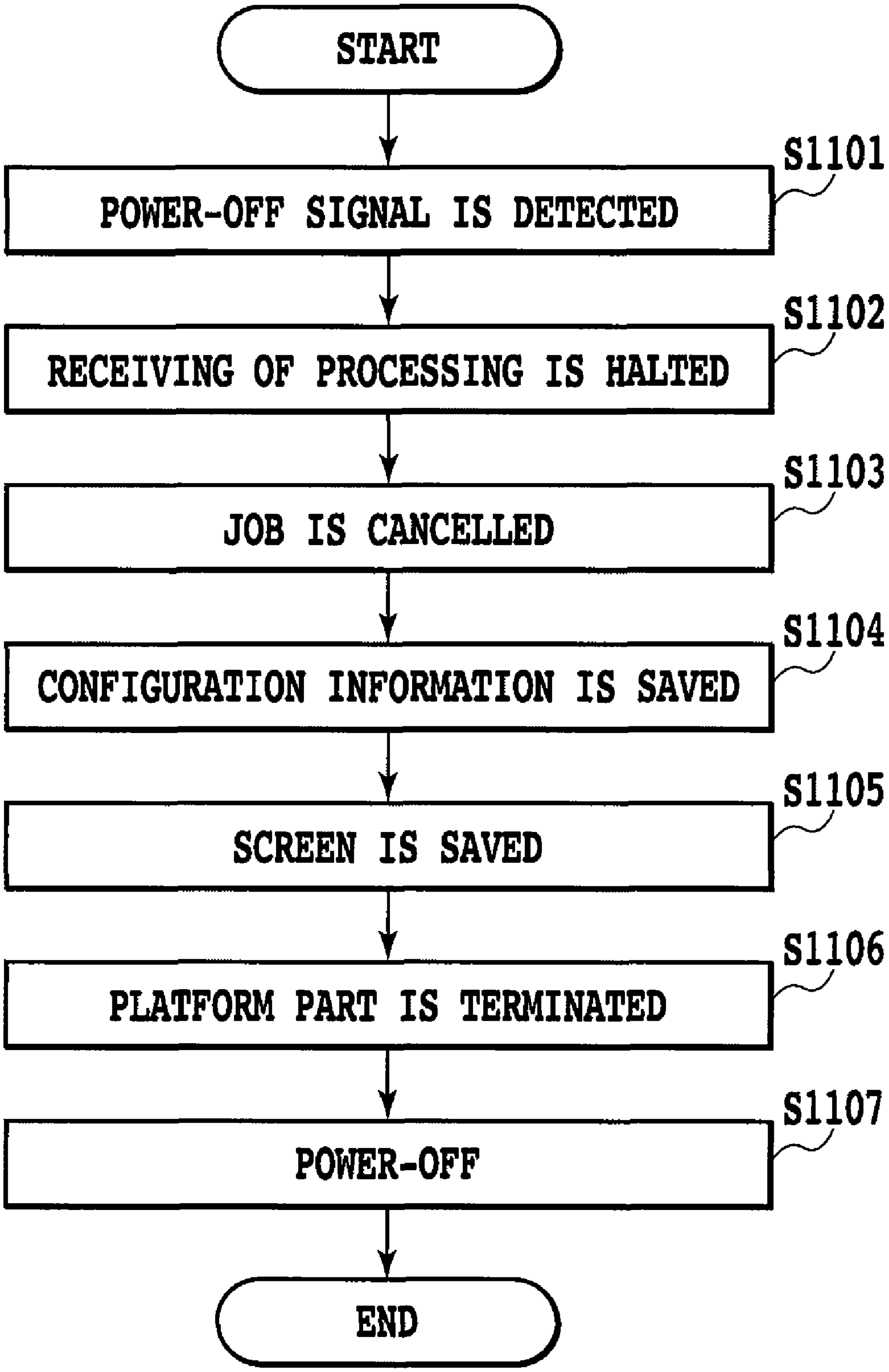
FIG. 11 is a flowchart showing one example of processing procedures by the image forming apparatus.

FIG. 11 is a flowchart showing processing for termination (power-off) of the image processing apparatus of the present embodiment.

First, a power supply button of the user interface 124 is pressed by a user on activation of the platform part 20 of the image forming apparatus 1, by which the platform part 20 detects a signal of power-off (Step S1101).

Next, the platform part 20 halts the receiving of instructions from a user at the user interface 124 (Step S1102). Then, the platform part 20 cancels all jobs with respect to an image processing apparatus 12 which have been saved at the direct storage part 123 (Step S1103). Then, the platform part 20 saves the configuration information 200 of the image forming apparatus 1 at the present time as configuration information on the previous activation at the indirect storage part 123 (Step S1104). The configuration information is used as configuration information on the previous activation when the image forming apparatus 1 is powered on next time, as described in FIG. 3.

After that, the platform part 20 saves at the indirect storage part 123 an operating screen displayed at the present time on the display of the user interface 124 as an operating screen on the previous activation (Step S1105). This operating screen on the previous activation is, as described in FIG. 3, used as the operating screen on the previous activation when the image forming apparatus 1 is powered on at the next time. Further, the operating screen on the previous activation is an operating screen which receives instructions from a user, for example, including operating screens shown in FIG. 4 and FIG. 9. A screen which exclusively deals with notifications to a user, for example, a screen which notifies a user of the processing now in progress, is not included in the operating screen on the previous activation.

Finally, the platform part 20 terminates all application programs which are activated. The CPU 121 then deletes the platform programs from the direct storage part 122 and terminates the platform part 20 (Step S1106). Further, the CPU 121 cuts off all power supplies of the image forming apparatus 1 (Step S1107).

Figure 12:
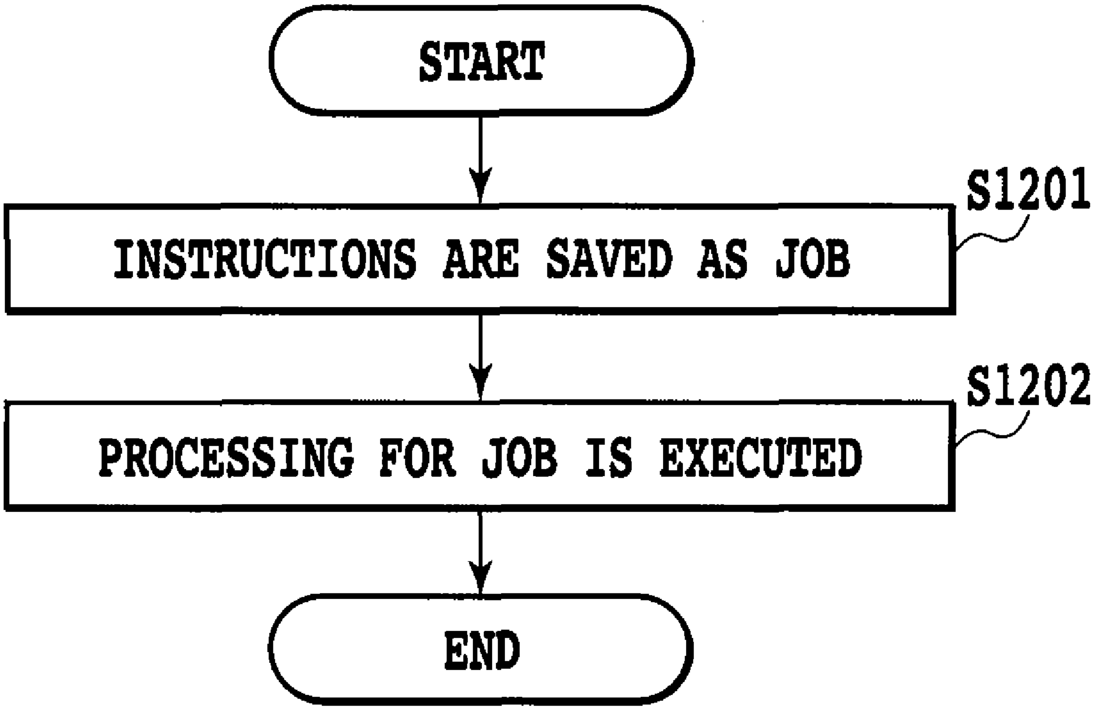
FIG. 12 is a flowchart showing one example of processing procedures by the image forming apparatus.

FIG. 12 is a flowchart showing one example of processing procedures for executing instructions from a user in the image processing apparatus of the present embodiment. This processing is controlled by the CPU 121 reading a program for carrying out the processing stored in the storage part 122 or 123 and shown in FIG. 12 to execute the program. In this processing, the platform part 20 executes instructions confirmed by a user on the previous activation screen 40, the simplified screen 60 and the ordinary screen 90 displayed respectively on the displays of the user interface 124 in S301, S305 and S308 as shown in FIG. 3.

The platform part 20 creates a job for executing instructions from a user which have been input via a touch panel and the like of the user interface 124 and saves the thus created job at the direct storage part 123 (Step S1201). Instructions from a user are instructions given when the above-described operating screen on the previous activation 40, the simplified screen 60, or the ordinary operating screen 90 is displayed on the display of the user interface 124 to receive instructions from a user. Instructions from a user include, for example, instructions for executing copy. Next, the platform part 20 reads a job saved at the direct storage part 123 in Step S1201 and executes the job with respect to the image processing apparatus 12 (Step S1202).

Figure 13:
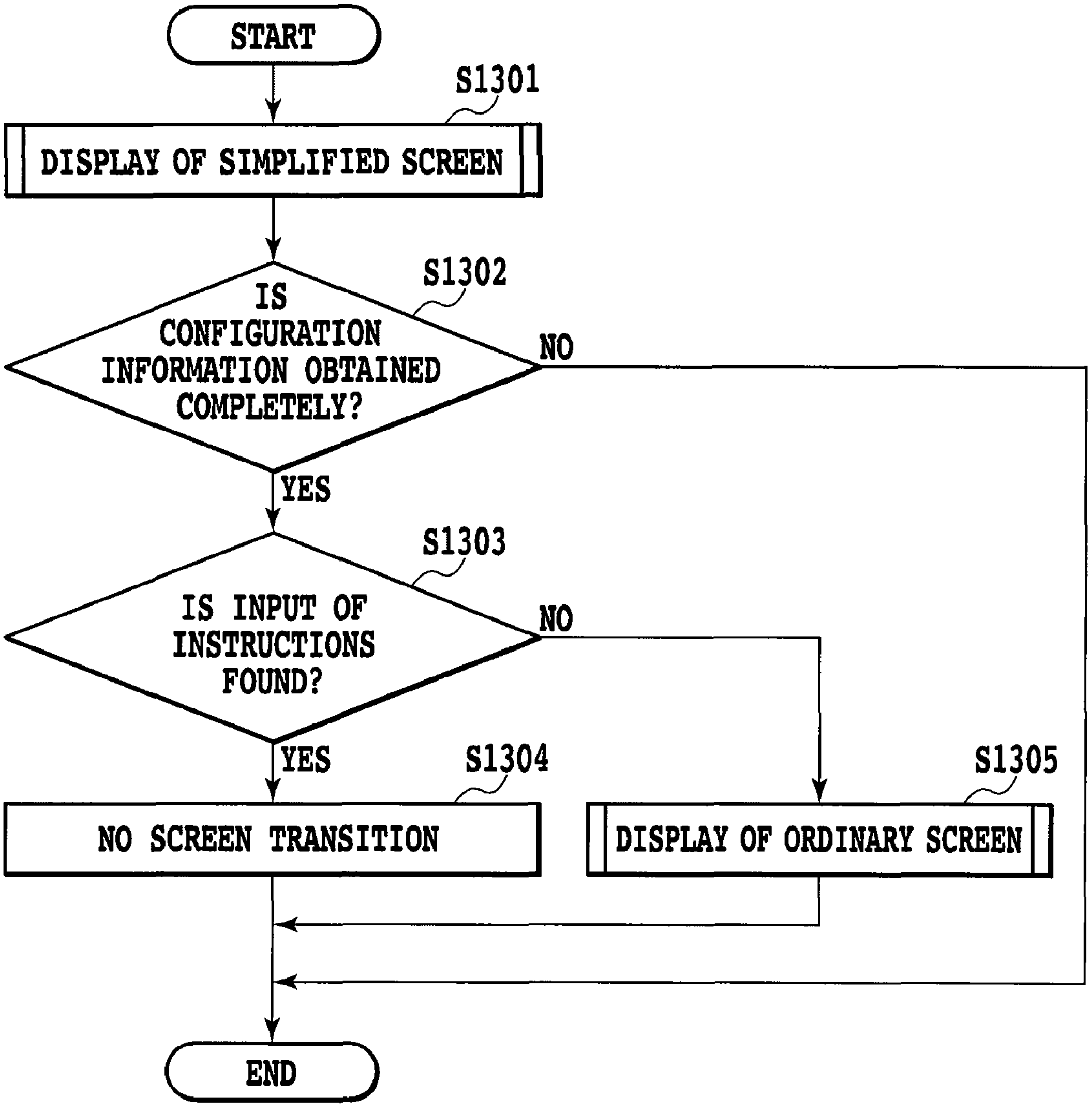
FIG. 13 is a flowchart showing one example of processing procedures by the image forming apparatus.

FIG. 13 is a flowchart showing processing for transition of an operating screen where instructions are received from a user for a simplified screen now on display of the present embodiment. This processing is controlled by the CPU 121 reading a program for carrying out processing stored in the storage part 122 or 123 and shown in FIG. 13 to execute the program.

First, in Step S1301, the platform part 20 deletes the operating screen on the previous activation on the display of the user interface 124 and halts the receiving of instructions from a user. Next, the platform part 20 displays the simplified screen 60 on the display of the user interface 124 and receives the instructions from a user. Receiving the instructions from a user, in this case, makes it possible not only to receive instructions for the simplified screen 60 but also to receive instructions for a new operating screen created upon receiving instructions for the simplified screen 60. Details of processing in Step S1301 are similar to those shown in FIG. 8.

Then, in Step S1302, the platform part 20 carries out processing similar to processing for updating configuration information records of the configuration information 200 described in Step S306 of FIG. 3, thereby determining whether the processing is completed for all the records.

In Step S1302, where a determination is made that the processing for updating all the records is completed (Step S1302; Yes), the processing proceeds to Step S1303. In Step S1303, the platform part 20 determines whether instructions are received from a user for the simplified screen 60 displayed in Step S1301 via a touch panel and the like.

Where the determination results in a finding that instructions have been received from a user (Step S1303; Yes), the platform part 20 does not carry out processing for transition of the operating screen displayed on a display but continues processing for displaying the simplified screen 60 (Step S1304). More specifically, the platform part 20 continues to make it possible to receive the instructions from a user for the simplified screen 60. Thereby, even in a state which is in the process of receiving of instructions from a user on the simplified screen 60, there is no chance of transition from a simplified screen to the ordinary operating screen 90, thereby preventing a user from being confused.

Further, where the determination in Step S1303 results in a finding that no instructions have been received from a user (Step S1303; No), the processing proceeds to Step S1305. In Step S1305, the platform part 20 deletes a simplified screen on the display of the user interface 124 and halts the receiving of instructions from a user. Then, the platform part 20 displays an ordinary operating screen 90 on the display of the user interface 124 and receives the instructions from a user. Receiving the instructions from a user, in this case, makes it possible not only to receive instructions for the ordinary operating screen 90 but also to receive instructions for a new operating screen created upon receiving instructions for the ordinary operating screen 90. The details of processing for displaying the ordinary operating screen in Step S1305 are similar to those shown in FIG. 10.

Figure 14:
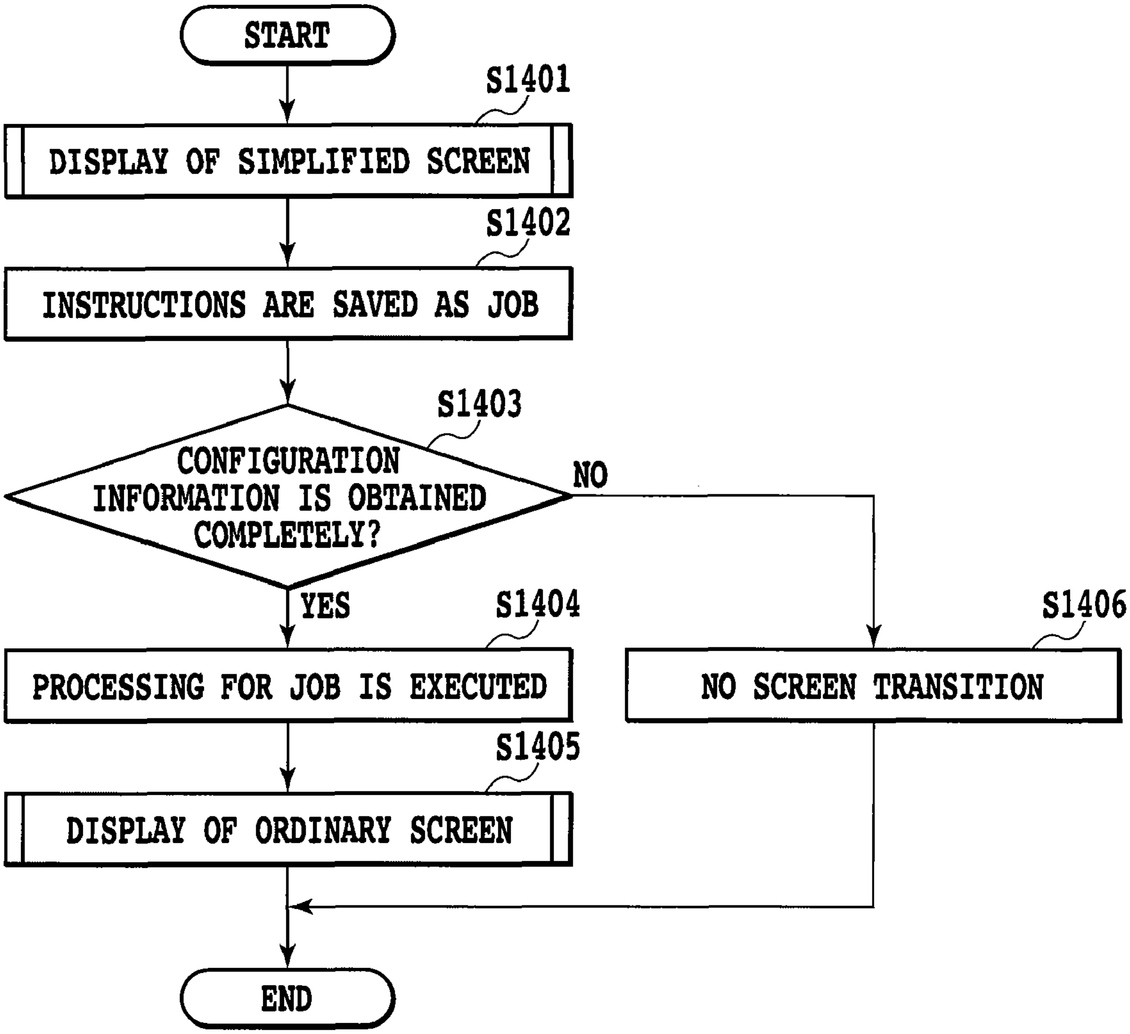
FIG. 14 is a flowchart showing one example of processing procedures by the image forming apparatus.

FIG. 14 is a flowchart showing processing for screen transition where instructions are received from a user for a simplified screen now on display of the present embodiment. This processing is controlled by the CPU 121 reading a program for carrying out processing stored in the storage part 122 or 123 shown in FIG. 14 to execute the program.

First, in Step S1401, the platform part 20 deletes the operating screen on the previous activation on the display of the user interface 124 and halts the receiving of instructions from a user. Next, the platform part 20 displays a simplified screen 60 on the display of the user interface 124 and receives the instructions from a user. Receiving the instructions from a user, in this case, makes it possible not only to receive instructions for the simplified screen 60 but also to receive instructions for a new operating screen created upon receiving instructions for the simplified screen 60. The details of processing in Step S1401 are similar to those shown in FIG. 8.

Next, in Step S1402, the platform part 20 creates a job for executing instructions input from a user via a touch panel or the like with respect to the simplified screen 60 displayed on the display of the user interface 124. The platform part 20 saves the thus created job at the direct storage part 123. An example of the instructions from a user includes instructions for executing copy.

Then, in Step S1403, the platform part 20 carries out processing similar to processing for updating configuration information records of the configuration information 200 described in Step S306 of FIG. 3, thereby determining whether the processing is completed for all the records.

In Step S1403, where a determination is made that the update processing is completed for all configuration information records (S1403; Yes), the platform part 20 reads the job saved at the direct storage part 123 in Step S1402 to execute the job (Step S1404).

Next, in Step S1405, the platform part 20 deletes a simplified screen on the display of the user interface 124 and halts the receiving of instructions from a user. Then, the platform part 20 displays an ordinary operating screen 90 on the display of the user interface 124 and receives the instructions from a user. Receiving the instructions from a user, in this case, makes it possible not only to receive instructions for an ordinary operating screen but also to receive instructions for a new operating screen created upon receiving instructions for the ordinary operating screen. The details of processing for displaying the ordinary operating screen in Step S1405 are similar to those of the processing shown in FIG. 10.

Further, in Step S1403, where a determination is made that there is a configuration information record which is not completed for the update processing (S1403; No), the processing proceeds to Step S1406. In Step S1406, the platform part 20 does not carry out processing for transition of the operating screen displayed on the display but continues to carry out processing for displaying a simplified screen 60. More specifically, the platform part 20 continues to keep a state capable of receiving of instructions from a user for the simplified screen 60.

As described above, according to the present embodiment, when the image forming apparatus is powered on, the platform part 20 displays an operating screen on the previous activation and also carries out processing for detecting any change in configuration information only once after it is powered on. It is, therefore, possible to provide an image forming apparatus capable of displaying an operating screen sooner, even if it takes a very long time to obtain the configuration information.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-231413, filed Sep. 9, 2008 which is hereby incorporated by reference herein in its entirety.

What is claimed is:

1. An apparatus to which one or a plurality of devices are connected, the apparatus including:

a display that displays an operating screen;

a storing unit that stores data of the operating screen displayed when the apparatus is active as data of a previously displayed operating screen and storing information on a device connected to the apparatus when the apparatus is active as configuration information, the previously displayed operating screen configured to display user-selectable options corresponding to a plurality of functions of the apparatus;

a start-up display unit that displays the previously displayed operating screen, based on the stored data, on the display after the apparatus is powered on;

a determining unit that determines whether there is any difference between configuration information of a device connected to the apparatus and configuration information of the apparatus indicated by the stored configuration information after the previously displayed operating screen is displayed on the display;

a first transitioning unit that transitions the display from the previously displayed operating screen to a simplified screen, in the case where the determining unit determines any difference between the configuration of the device connected to the apparatus and the configuration of the apparatus indicated by the stored configuration information, the simplified screen configured to display and operate, prior to the stored configuration information being completely updated, user-selectable options corresponding to only fundamental functions out of the plurality of functions of the apparatus;

an updating unit that updates the stored configuration information to information on the device connected to the apparatus in the case where the determining unit determines any difference between the configuration of the device connected to the apparatus and the configuration of the apparatus indicated by the stored configuration information; and a second transitioning unit that transitions the display from the simplified screen to an operating screen which reflects a configuration indicated by the updated configuration information after completion of updating the configuration information.

2. The apparatus according to claim 1, wherein the previously displayed operating screen is a screen displayed just before the apparatus is powered off, and the configuration information is information on a device connected to the apparatus just before the apparatus is powered off.

3. The apparatus according to claim 2, further comprising:

a user interface that receives an input of instructions from a user; and a reflecting unit that displays the simplified screen that reflects the instructions input in the case where the instructions input by the user for the previously displayed operating screen displayed by the start-up display unit can be operated on the simplified screen.

4. The apparatus according to claim 2, further comprising:

a user interface that receives an input of instructions from a user, wherein the second transitioning unit performs the transition after the configuration information is completely updated, in the case where no instructions are input into the simplified screen via the user interface.

5. The apparatus according to claim 4, wherein the second transitioning unit performs the transition after the configuration information is completely updated and a job corresponding to the instructions is executed, in the case where instructions for the simplified screen are input via the user interface.

* * * * *